June 8, 1965 D. F. ELDRIDGE 3,188,399

MAGNETIC TRANSDUCING ASSEMBLY

Filed Nov. 28, 1960

DONALD F. ELDRIDGE
INVENTOR.

BY Nathan N. Kallman

ATTORNEY

United States Patent Office 3,188,399

Patented June 8, 1965

3,188,399

MAGNETIC TRANSDUCING ASSEMBLY

Donald F. Eldridge, Palo Alto, Calif., assignor to Ampex Corporation, Redwood City, Calif., a corporation of California Filed Nov. 28, 1960, Ser. No. 72,122

11 Claims. (Cl. 179—100.2)

This invention relates to magnetic transducing assemblies, and in particular to a recording and reproducing system wherein the transducing of a signal is controlled by magnetic scanning means.

In presently known recording and reproducing systems for processing high frequency signals, such as a video signal for example, transverse recording onto a magnetic storage medium is effected by the use of a rotary drum carrying one or more magnetic transducers that scan the moving magnetic medium or magnetic tape. This type of system requires expensive and relatively complicated controls and servomechanisms, and also entails complex electronics to provide proper synchronization.

An object of this invention is to provide an improved magnetic transducing assembly.

Another object of this invention is to provide a stationary magnetic transducing assembly for transverse recording.

Another object is to provide a magnetic scanning device which controls the transducing action of a magnetic head.

According to the invention, a magnetic transducer having a nonmagnetic gap is magnetically coupled with a magnetic body. The magnetic transducer may comprise a core formed from a plurality of discrete magnetizable elements arranged serially, such as a stack of laminations, and a nonmagnetic gap coextensive with the magnetizable elements. The magnetic body, which may be in the form of a disk for example, intersects a portion of the core so that the magnetizable elements are disposed in seriatim along a radius of the magnetic body.

In operation, the magnetic disk is progressively saturated in a radial direction by a scanning or sweep signal. Where the disk is unsaturated, magnetic signals may pass through directly from one surface to the other surface. Therefore, an information signal which is applied to the intersected core of the magnetic transducer passes through the disk only in that area where the disk is unsaturated and through those elements that are intersected by the unsaturated disk area. As a result, flux lines are varied only at those areas of the gap which are associated with such elements carrying the information signal. Because the variation of the unsaturated area can be controlled in accordance with the sweep signal, the scanning of the information signal over the extent of the gap may also be controlled. Recording of the information signal as it is scanned may be achieved by traversing the gap with a magnetic medium or tape, as is well known.

In one embodiment of the invention wherein the disk is continuous, after application of a complete scanning signal such as a sawtooth signal, the disk, remains in a saturated state being polarized in one circular direction. By reversing the polarity of the scanning signal, the disk becomes polarized in the opposite circular direction progressively outwardly in a radial direction. However, between the areas of opposite polarization a very narrow boundary region or minute zone of unsaturation is established. This "information-passing" zone is moved radially towards the periphery of the disk in accordance with the increasing swep or control signal. In this manner, an information signal may be recorded transversely across a magnetic tape which is moved perpendicularly to the gap that is aligned radially with the stationary disk.

In another embodiment of the invention wherein the disk is discontinuous, a sweep signal of one polarity is employed. The zone of saturation progressively sweeps outwardly from the center of the disk, and polarization of the disk occurs in one circular direction. An information signal may be recorded across the path of the gap simultaneously with the radial sweep across the disk. When the sweep signal has reached its peak amplitude, the disk is entirely saturated, and the sweep signal is then returned to zero so that the discontinuous disk becomes unsaturated. The transducer assembly is now ready to begin recording a new line of information transversley across a tape.

The invention will be described in greater detail with reference to the drawing in which.

Figure 1:
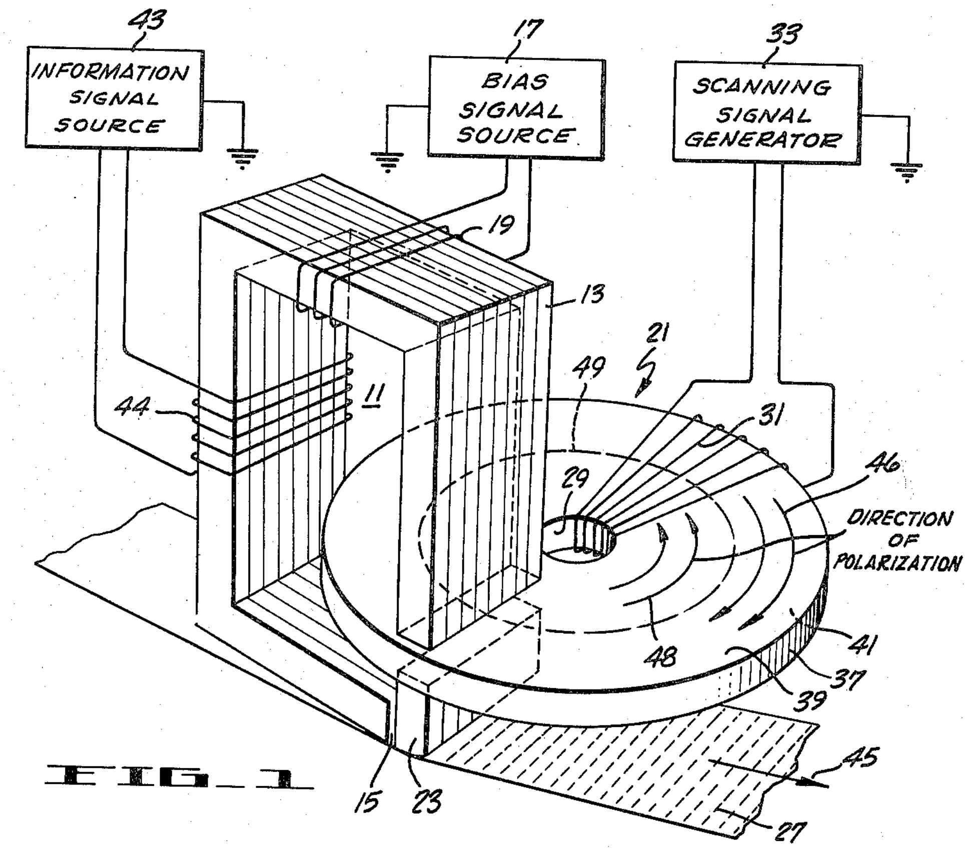
FIGURE 1 is a perspective view, partly in block form, of a magnetic transducing assembly according to this invention.

In FIGURE 1, a magnetic transducing assembly comprises a magnetic transducer or head 11 which may be formed as a core from a stack of laminations 13 of magnetic material, such as Permalloy. The core of the magnetic head 11 has a nonmagnetic gap 15 which is coextensive with the stack of laminations 13. If the transducer 11 is to be used for audio frequency signal recording, a bias signal source 17 may be coupled to a coil 19 which is wound about one portion of the magnetic head 11. It is understood that for the purpose of FM or pulse recording, a bias signal need not be used.

In accordance with this invention, a toroidal structure such as a stationary ferromagnetic disk 21 of highly permeable material, illustrated in FIGURE 1, is joined in intersecting relationship with one portion 23 of the core of the head 11. The disk 21 and the head 11 are closely magnetically coupled and are so fixed relative to each other that the core surfaces 25 formed by the intersection of the laminated stack 13 adjacent to the intersecting disk 21 are disposed along a radius $r$ of the disk 21. Similarly, the nonmagnetic gap 15 is formed in the core so as to be substantially coextensive and parallel with such core surfaces 25 in a radial direction, though spaced therefrom.

Figure 3:
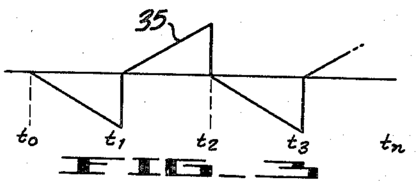
FIGURE 3 and 4 show waveforms of sweep signals which are applied to the magnetic disks of FIGURE 1 and 2 respectively.
Figure 4:
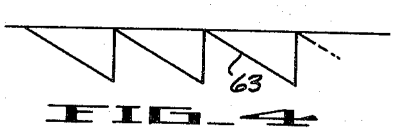

The magnetic disk 21, which has a radius approximately equal to the width of a magnetic tape 27 used in the system, has a centrally located aperture 29 utilized for winding a coil 31 around a portion of the disk 21. The coil 31 is coupled to a scanning signal generator 33 which supplies a sweep signal such as a sawtooth current waveform 35, as shown in FIGURE 3.

In operation, the scanning signal 35 is applied through the coil 31 to the magnetic disk 21. Circular lines of flux concentric with the disk 21 are created within the disk. The disk 21 which is made of square loop material such as Deltamax, becomes saturated progressively in accordance with the intensity of the sawtooth signal 35 radially to the periphery 37 of the disk 21. When the disk 21 is in a completely saturated state with the disk material polarized in one circular direction, the transducing assembly is ready for transverse recording.

To achieve recording, the bias signal from the source 17 and the sweep signal from the generator 33 are applied in conjunction with an information signal to be recorded, provided by a signal source 43 that is coupled to the transducer 11 by a coil 44. Concurrently, the magnetic medium or tape 27 is moved across the gap 15 in the direction shown by the arrow 45, which is perpendicular to the extent of the gap 15 and the disk radius $r$. If the disk 21 has been polarized by a sawtooth signal of such polarity that the remanent polarization is clockwise as indicated by the arcuate arrows 46 for example, then the reversed polarity of the sweep signal causes the disk to be polarized counterclockwise as shown by the arrows 48. Thus, as the signal 35 sweeps the disk 21, a saturation zone 47 spreads outwardly to reverse the direction of previous polarization. However, between the areas of reverse polarization, a narrow boundary or finite nonsaturated zone 49 is developed.

The very narrow nonsaturated zone 49 which is swept radially towards the periphery of the disk 21 has a high permeability which allows magnetic flux to pass between those portions of the disk surfaces 39 and 41 where the zone 49 appears. Thus as the information signal is supplied to the head 11 from the source 43 in conjunction with the sweep signal 35, a complete magnetic path carrying such information signal is established through the discrete lamination 13 which is associated with the finite nonsaturated zone 49 at any given instant. In this manner, the information signal causes the flux field to vary at a defined portion of the gap 15 which corresponds to the information carrying lamination 13. The rate of change of flux at such defined portion is sensed by the magnetic tape 27 and recorded at an area of the tape which is adjacent to the gap portion wherein the information signal is represented by the varying flux lines. Since the information signal is swept across the extent of the gap 15 perpendicularly to the longitudinal movement of the tape 27, the signal is recorded transversely on the tape 27.

Thus the ferromagnetic disk 21 serves as a switch which controls the transducing action of the nonmagnetic gap 15.

Figure 2:
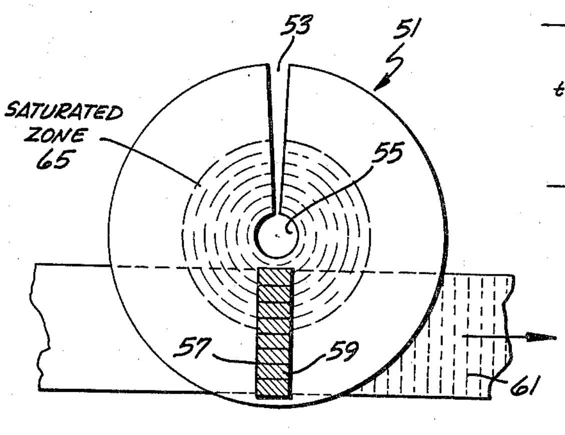
FIGURE 2 shows an alternative form of a magnetic disk used in the magnetic transducing assembly of FIGURE 1.

In FIGURE 2, an alternative embodiment is shown comprising a magnetic disk 51 having a grooved portion or discontinuity 53 extending from a central aperture 55 to the perimeter of the disk 51. The disk 51 is coupled in the same manner as the disk 21 of FIGURE 1 to a magnetic transducer 57 having discrete magnetizable elements 59. Sources of signal (not shown in FIGURE 2) are coupled to the transducer 57 and disk 51, and a magnetic tape 61 traverses a gap in the laminated transducer 57.

In this embodiment, whenever the scanning or saturating signal 63 is removed, the disk 51 becomes unsaturated as a result of the discontinuity 53. Therefore a scanning signal 63 of one polarity is used for cyclically sweeping the disk 51 to provide an alternately expanding and collapsing saturation zone 65. The tape 61 is moved slowly relative to the rapid scan of the sweep signal 63 so that one transverse line of information may be recorded across the tape for each cycle of sweep signal.

It is also understood that the scope of the invention is not limited to the embodiments shown but encompasses the use of any magnetic control element wherein a scan signal may be applied to control the transducing action of a magnetic transducing assembly. In addition, more than one transducer may be used with a magnetic switch or control disk, in accordance with this invention, to provide duplicate recordings on separate tapes. The invention may also be used for digital applications whereby the location of the boundary zone is quickly sensed to indicate the current in the winding of the magnetic disk.

Playback may be achieved by conventional reproducing means, or by use of the magnetic switch of this invention.

There has been described herein a magnetic transducing assembly utilizing a magnetic control element to control the transducing action of a magnetic transducer.

What is claimed is:

1. A magnetic transducing assembly comprising: a stationary magnetic control element; a magnetic transducer magnetically coupled to said element; said transducer having a wide transducer path including a nonmagnetic gap, said transducer path normally having a very high reluctance, said control element coupled to said transducer and for enabling small portions of said transducer path to assume a very low reluctance in a predetermined manner; and means coupled to said transducer for supplying an information signal, means coupled to said control element for activating said control element with a predetermined control signal so that the transducing action of said transducer is controlled by said control element in accordance with said activating means.

2. The structure recited in claim 1 wherein said transducer includes a second gap, said second gap having said control element interposed therein.

3. The structure recited in claim 2 wherein said control element is a magnetic member magnetized in a first direction and then in a second direction by said means for activating whereby the reluctance of portions of said transducer path assume lower values in a predetermined manner.

4. A magnetic transducing assembly comprising: a magnetic transducer having a nonmagnetic gap; a stationary magnetic switch means magnetically coupled to said transducer for enabling only small portions of said transducer to effectively apply a flux across said gap; means for applying an information signal to be recorded to said transducer; means for applying a control signal to said switch to control the recording of said information signal in a predetermined manner; and a magnetic medium for traversing said gap so that said information signal is recorded on said medium in accordance with said control signal.

5. A magnetic transducing assembly comprising: a magnetic transducer having a nonmagnetic gap; a magnetic disk intersecting a portion of said transducer, said portion being disposed transversely and radially to said disk; means for applying a scanning signal to said disk for progressively saturating said disk in said radial direction; means for applying an information signal to be recorded to said transducer; and a movable magnetic medium for traversing said gap perpendicularly to said gap so that said information signal is recorded transversely on said medium in relation to said radial saturation of said disk.

6. A magnetic transducing assembly comprising: a stack of magnetic laminations forming a magnetic transducer having a nonmagnetic gap therein; means for applying an information signal to said transducer; a magnetic toroidal body intersecting a portion of said transducer; means for applying a sweep signal to said body so that said body is saturated progressively along a radial direction thereof; and a magnetic medium for traversing said gap so that said information signal is recorded on said medium in accordance with the progressive saturation of said body.

7. A magntic transducing assembly comprising: a magnetic transducer comprising a stack of discrete laminations forming a core; a nonmagnetic gap disposed in said core coextensive with said stack of laminations; means for applying a bias signal coupled to said core; means for applying an information signal coupled to said core, a magnetic disk magnetically coupled to said core, said disk transversely intersectiong a portion of said core, said core portion being disposed radially relative to said disk; means for applying a sweep signal to said disk for saturating said disk progressively in a radial direction towards the periphery of said disk; and a magnetic medium for traversing said nonmagnetic gap so that said information signal may be recorded on said medium in relation to the sweep of said sweep signal.

8. A magnetic transducing assembly comprising: a magnetic transducer comprising a stack of discrete laminations forming a core; a nonmagnetic gap disposed in said core coextensive with said stack of laminations; a first coil for applying a bias signal coupled to said core; a second coil for applying an information signal coupled to said core; a ferromagnetic disk having an aperture centrally located therein, coupled to said core, said disk transversely intersecting a portion of said core, said core portion being disposed radially relative to said disk; a third coil wound around a portion of said disk and through said aperture; a sweep signal generator coupled to said third coil for supplying a sweep signal of reversing polarity, said sweep signal causing said disk to become saturated radially and polarized concentrically with said disk in one direction as said sweep signal first increases linearly in intensity, and as said sweep signal is reversed in polarity reversing said one direction of said polarization as said disk is saturated radially while said sweep signal linearly increases in intensity similarly but opposite to said first linear increase thereby establishing a finite moving zone of nonsaturation; and a magnetic medium for traversing said nonmagnetic gap so that said information signal may be transversely recorded on said medium.

9. A magnetic transducing assembly comprising: a magnetic transducer comprising a stack of discrete laminations forming a core; a nonmagnetic gap disposed in said core coextensive with said stack of laminations; a first coil for applying a bias signal coupled to said core; a second coil for applying an information signal coupled to said core; a disk coupled to said core having an aperture centrally located therein and a discontinuity, said disk transversely intersecting a portion of said core, said core portion being disposed radially to said disk; a third coil wound around a portion of said discontinuous disk and through said aperture; a sweep signal generator coupled to said third core for supplying a linearly increasing sweep with a return to zero, said sweep signal causing said disk to be saturated radially as said sweep signal increases in intensity and causing said disk to become nonsaturated as said signal is returned to zero; and a magnetic medium for traversing said nonmagnetic gap so that said information signal may be transversely recorded on said medium.

10. A magnetic transducing assembly comprising: a magnetic core having discrete laminated elements and a nonmagnetic gap extending through a portion of said core, means for applying an information signal to said core; a magnetic disk intersecting a portion of said core, said intersected core portion being coextensive with said gap, said disk having a nonmagnetic discontinuity; and means for applying a control signal to said disk to control the transducing of said information signal.

11. A transducer assembly comprising: a transducer forming a core; a non-magnetic gap disposed in said core coextensive therewith; a coil for applying an information signal coupled to said core; a control element coupled to said core, said control element transversely intersecting a portion of the width of said core; a second coil wound about a portion of said control element; a sweep signal generator coupled to said second coil for supplying a sweep signal of reversing polarity, said sweep signal causing said control element to become saturated transversely across the width of said core and polarized in one direction as said sweep signal first increases linearly in intensity with a first polarity and then as said sweep signal is reversed in polarity and increases linearly in intensity causing the reversal of said one direction of said polarization of said control element and causing said control element to again saturate transversely thereby establishing a finite moving zone of non-saturation; and a magnetic medium for transversing said nonmagnetic gap so that information signals may be transversely recorded on said medium.

References Cited by the Examiner

UNITED STATES PATENTS

| | | | |
|---|---|---|---|
| 2,743,318 | 4/56 | De Forest | 179—100.2 |
| 2,800,384 | 7/57 | Parker | 179—100.2 |
| 2,955,169 | 10/60 | Stedtnitz | 179—100.2 |
| 3,032,765 | 5/62 | Begun | 346—74 |
| 3,084,227 | 4/63 | Peters | 179—100.2 |

FOREIGN PATENTS

| | | |
|---|---|---|
| 1,059,199 | 6/59 | Germany. |

IRVING L. SRAGOW, *Primary Examiner.*

NEWTON N. LOVEWELL, *Examiner.*